United States Patent Office 3,544,562
Patented Dec. 1, 1970

3,544,562
PROCESS FOR THE MANUFACTURE OF OMEGA-DECALACTAM USING EPSILON-CAPROLACTAM AS A SOLVENT THEREFOR
Hans-Joachim Schultze and Clau Berther, Chur, Grisons, Switzerland, assignors to Inventa A.G. fur Forschung und Patentverwertung, Zurich, Switzerland
No Drawing. Filed June 29, 1967, Ser. No. 657,457
Claims priority, application Switzerland, June 30, 1966, 9,511/66
Int. Cl. C07d 41/06
U.S. Cl. 260—239.3                                  7 Claims

ABSTRACT OF THE DISCLOSURE

A process for the manufacture of omega-decalactum utilizing the solvent power of epsilon-caprolactam. The caprolactam can be added to cyclodecanone oxime prior to the Beckmann type rearrangement to decalactam, or else, can simultaneously be produced by mixing cyclodecanone and cyclohexanone in suitable proportions and oximating and rearrangement in mixture. The resulting lactams can readily be separated by fractionation, and two pure products in good yields thus are obtained.

---

Omega-decalactam is produced by a Beckmann type rearrangement of cyclodecanone oxime and has a high melting point, i.e., 164° C. This leads to difficulties in the production cycle because the lactam separates as a solid, but in the form of fine particles, upon the neutralization of the acidic rearrangement product. Filtration is not only a long drawn out procedure but also leads to a filter cake having up to 30% residual water content, so that an additional drying step is required. The use of centrifuges also has been found unsatisfactory.

The theoretically simplest manner of separating the omega-decalactam, hence, is an extraction of the neutralization mixture with a suitable organic solvent, e.g., a halogenated hydrocarbon such as chloroform or carbon tetrachloride, or with simple aliphatic, cycloaliphatic or aromatic hydrocarbons. However, all these substances have great drawbacks for the process at hand.

One of these drawbacks resides in the fact that a large amount of solvent is required owing to the slight solubility of decalactam in most of them. Furthermore, the boiling points of omega-decalactam and of the solvents are so remote from each other that difficulties arise upon distillation because, after removal of the solvent, the melting point of decalactam is not attained, so that the latter again is present in solid form.

In the case of similar compounds, such as omega-dodecalactam, structurally related materials having suitable solvent activity and boiling points have successfully been used. However, in the omega-decalactam manufacture, such structurally related compounds, e.g., cylcodecanone and cyclodecane, are not applicable because of their lack of stability and ensuing losses. This renders their use uneconomical.

It now has surprisingly been found that epsilon-caprolactam is an excellent solvent for omega-decalactam. It melts all requirements for a solvent, i.e., it has good solvent power for recalactam at the neutralization temperature and has a boiling point which permits separation of the two materials by distillation without difficulties. Moreover, the solvent is of similar nature as the solute and traces of the former remaining in the latter do not adversely affect its quality.

The caprolactam can be used as solvent for the decalactam by adding it to the neutralization product obtained in the neutralization of the rearrangement product of cyclodecanone oxime. Two phases are obtained thereby which can readily be separated: One light organic phase consisting of the liquid mixture of omega-decalactam and epsilon-caprolactam, and a heavier aqueous phase containing ammonium or sodium sulfate derived from the neutralization of sulfuric acid with $NH_3$ or NaOH, respectively. After simple separation, these phases can easily be worked off. The caprolactam here acts as a pure solvent for the decalactam. It is distilled and re-used as solvent in either batchwise or continuous processes.

In another, even more advantageous embodiment of the invention, the caprolactam is not added only upon neutralization of the rearranged product, but is permitted to form during the Beckmann rearrangement. This is accomplished by subjecting a mixture of oximes in predetermined percentages to the Beckmann rearrangement. These oximes can be produced separately or can also be manufactured in common. In this embodiment, the caprolactam assumes the function of a solvent and also is a synthesis product.

The simultaneous manufacture of cyclohexanone oxime and cyclodecanone oxime is highly advantageous because the oximation speed of cyclodecanone is increased under the solvent action of the more hydrophilic cyclohexanone. This leads to a considerable decrease in the required oximation time compared with pure cyclodecanone. Conversely, the hydrophobic characteristics of the cyclodecanone oxime portion diminish the water acceptability of the mixture as compared to pure cyclohexanone oxime so that the heat of reaction in the Beckmann rearrangement is decreased and the quality of the epsilon-caprolactam thus obtained greatly improved.

It therefore is one object of the invention to produce epsilon-caprolactam and omega-decalactam by oximation of a mixture of cyclohexanone and cyclodecanone and and subjecting the oxime mixture thus obtained to a Beckmann rearrangement.

Another object of the invention is the utilization of the caprolactam produced as solvent for the recalactam, produced simultaneously.

Other objects will become apparent from the description of the examples, as set forth below and from the appended claims.

The oximation of the cyclodecanone and cyclohexanone mixture with suitable hydroxylamine salts, known per se, at a pH of 3–7 yields an oxime mixture which is liquid at the oximation temperatures, i.e., at 50–110° C., with any given proportions of the components, on the basis of the melting points.

The proportions at the oximation hence depend on the usable mixed melting point range of the lactams and, within that range, on economical considerations. Therefore, these proportions of the components may be between 40:60 and 90:10 weight parts cyclohexanone to cyclodecanone or epsilon-caprolactam to omega decalactam, respectively. When decalactam is preferred as the end product, proportions 40:60 to 50:50 are employed.

The mixture thus obtained can directly be rearranged according to Beckmann. For that purpose, lactams are mixed with sulfuric acid, and the oximes to be rearranged plus the required amount of sulfuric acid and/or oleum are added thereto. This procedure prevents a violent and frequently uncontrollable reaction which takes place when oxime and sulfuric acid are mixed alone. The sulfuric acid used opportunely contains enough free $SO_3$ to just compensate for the water present in the oxime mixture. The weight proportions of oxime mixture to sulfuric acid depend upon the composition of the mixture. For instance, for a cyclohexanone oxime-cyclodecanone oxime mixture of 40:60 to 50:50, the weight proportions are between 1:1 and 1:2, and preferably between 1:1.1 and 1:1.4. The reaction temperature is 90–120° C., and preferably 100–110°. Oximation and rearrangement may be carried out continuously or batchwise.

Because the rearrangement proceeds more smoothly with rising molecular weight of the oximes, a particular advantage of the process according to the invention resides in the fact that the violent reaction occurring with pure cyclohexanone oxime is weakened when an oxime mixture is used which has an average higher molecular weight. This results in a direct improvement of the quality of the caprolactam produced in this manner.

The rearrangement product thus obtained is neutralized in the conventional manner, e.g., with ammonia or sodium hydroxide. The properties of the two lactams complement each other to a great extent in this process step also. The caprolactam portion acts as a solvent or melting point depressant for the high-melting decalactam whereby a liquid organic phase forms over the heavier salt-containing aqueous phase.

The principal advantage of the process according to the invention resides in obtaining a lactam mixture from the Beckmann rearrangement which, at temperatures below 100° C., is liquid. On the other hand, the omega-decalactam present in the melt, due to its hydrophobic character, largely compensates for the water acceptance of the hydrophilic omega-caprolactam.

Separation of the two lactams by fractionation is simple since epsilon-caprolactam distills at 150° C. and 10 torr, omega-decalactam at 184°. However, if so desired, the mixture need not be separated but can be copolymerized.

The invention now will be further explained by the following examples. However, it should be understood that these are given merely by way of illustration, and not of limitation, and that it is intended to cover all modifications and variations which do not depart from the spirit and the scope of the invention as hereinafer claimed.

Temperatures are given in degrees centigrade; percentages are weight percent.

EXAMPLE 1

1,000 g. cyclohexanone were mixed with 1,050 g. cyclodecanone and reacted with 9 liters of an aqueous solution containing 1,782 g. hydroxylamine sulfate at a pH of 5.5–6. The sulfuric acid liberated during oximation was continuously neutralized by addition of 12% aqueous ammonia. Depending upon the speed of agitation, oximation took 2.5 to 3 hours. The liquid oxime layer readily could be separated from the aqueous layer. After evaporation of slight quantities of water at 100–102°, 2,270 g. mixed oximes were obtained, i.e., 98.4% of theory.

The 2,270 g. mixed oxime were introduced into a blend of 250 g. epsilon-caprolactam and 250 g. omega-decalactam and 550 g. 100% sulfuric acid with intensive agitation and cooling. 2,500 g. sulfuric acid containing 6% free $SO_3$ simultaneously were introduced, all within a time of 75 minutes. Introduction and cooling were carried out so that the reaction temperature remained between 105 and 110°. The temperature then was held at 00° for 30 more minutes and then neutralized at 90–100° by introducing it into a 12% aqueous ammonia solution containing approximately 40% ammonium sulfate. The mixture of epsilon-caprolactam and omega-decalactam thereby separated as a substantially colorless oily liquid above the aqueous layer. After separation and distillation under reduced pressure, 1,315 caprolactam (96.3 of theory) and 1,335 decalactam (97.8 of theory) were recovered.

When the mixture of cyclohexanone oxime and cyclodecanone oximes was in proportions of 70:30 and 90:10, respectively, under otherwise like conditions, yields were obtained as shown in Table 1:

TABLE I

|  | 70:30 | 90:40 |
|---|---|---|
| Epsilon-caprolactam, percent | 95.3 | 95.1 |
| Omega-decalactam, percent | 97.6 | 98.1 |

EXAMPLE 2

2,150 g. of a mixture obtained by the Beckmann rearrangement of 1,000 g. cyclodecanone oxime in 1,150 g. sulfuric acid (100%) were neutralized in a 40% aqueous ammonia sulfate solution with simultaneous addition of 12% ammonia water in such a manner that the pH at all times remained between 4 and 6 and that the temperature did not sink below 90°. Omega-decalactam thereby separated as a finely divided amorphous solid. After completion of the neutralization, 1,000 g. crude epsilon-caprolactam were added in solid form or, even better, as a liquid at a tmperature above 70°. The mixture then was agitated while heating. After 5 minutes of intensive stirring, the two liquid phases were allowed to settle and then were separated. The upper layer was a mixture of omega-decalactam and epsilon-caprolactam, the aqueous layer was an ammonium sulfate solution containing solely traces of lactams.

We claim as our invention:

1. In a process for the manufacture of omega-decalactam from cyclodecanone by oximation, neutralization, Beckmann type rearrangement and recovery by means of a solvent, the improvement which comprises using as said solvent epsilon-caprolactam which is produced simultaneously with the decalactam from a mixture of cyclodecanone and cyclohexanone.

2. The process as defined in claim 1, wherein the mixture of cyclohexanone to cyclodecanone is in weight proportions ranging from 90:10 to 40:60.

3. A process for the manufacture of epsilon-caprolactam and omega-decalactam wherein said caprolactam and its intermediates act as solvent for said decalactam and intermediates, which comprises oximating mixed cyclohexanone and cyclodecanone in weight proportions ranging from 90:10 to 40:60 at substantially 50–110° C. with hydroxylamine salts at a pH of substantially 3 to 7; subjecting the oxime mixture to a Beckmann type rearrangement with a substance selected from the group consisting of sulfuric acid, oleum or mixtures thereof, at substantially 90–120° C., and recovering the mixture of epsilon-caprolactam and omega-decalactam thus obtained.

4. The process as defined in claim 3, wherein said proportions are from 50:50 to 40:60 and the weight proportions of oxime mixture to said substance 1:1 to 1:2.

5. The process as defined in claim 3, wherein oximation is carried out in the presence of omega-decalactam and epsilon-caprolactam in order to suppress the violence of the reaction.

6. The process as defined in claim 5, wherein said decalactam and caprolactam are present in amounts of substantially 20 weight percent relative to the mixed oximes.

7. The process as defined in claim 3, wherein the lactams formed are separated by fractionation.

References Cited

UNITED STATES PATENTS 3,334,089   8/1967   Harms et al. _____ 260—239.3

OTHER REFERENCES

Hiller et al.: "Principles of Chemistry," pp. 441–446, McGraw-Hill (1960).

Sitlig: "Caprolactam and Higher Lactams," Noyes Development Corp. (1966), p. 82.

HENRY R. JILES, Primary Examiner

R. T. BOND, Assitant Examiner